United States Patent [19]

Niitsuma et al.

[11] Patent Number: 4,739,830

[45] Date of Patent: Apr. 26, 1988

[54] METHOD OF COLLECTING GEOTHERMAL STEAM USING AE/MA MEASUREMENT

[75] Inventors: Hiroaki Niitsuma; Katsuto Nakatsuka; Hideaki Takahashi, all of Sendai; Morihiko Takanohashi; Ko Sato, both of Morioka; Fumihiko Chiba, Iwate, all of Japan

[73] Assignees: Japan Metals & Chemicals Co., Ltd., Tokyo; H. Niitsuma, Miyagi; K. Nakatsuka, Miyagi; H. Takahashi, Miyagi, all of Japan

[21] Appl. No.: 904,281

[22] Filed: Sep. 8, 1986

[30] Foreign Application Priority Data

Sep. 10, 1985 [JP] Japan .................................. 60-200267

[51] Int. Cl.$^4$ ........................ E21B 47/00; E21B 43/12
[52] U.S. Cl. .................................... 166/250; 166/370; 166/369
[58] Field of Search ............... 166/250, 254, 369, 370; 181/106, 101, 122; 367/14

[56] References Cited

U.S. PATENT DOCUMENTS

| | | | |
|---|---|---|---|
| 3,739,871 | 6/1973 | Bailey | 367/14 |
| 4,057,780 | 11/1977 | Shuck | 181/106 |
| 4,280,200 | 7/1981 | Silverman | 166/254 |
| 4,432,078 | 2/1984 | Silverman | 367/14 |
| 4,524,434 | 6/1985 | Silverman | 166/254 |

OTHER PUBLICATIONS

Hideaki Takahashi et al., "Determination of Fracture Toughness of Granitic Rock by Means of AE Technique", *Journal of Mining and Metallurgical Institute of Japan*, vol. 100, No. 1151, Jan. 1984.
Katsuto Nakatsuka, et al., "In-Situ Measurement of the Extension of Hydraulically-formed Fracture in Geothermal Well by Means of Acoustic Emission", *Journal of Mining and Metallurgical Institute of Japan*, vol. 98, No. 1129, Mar. 1982.
Morihiko Takanohashi et al., "Evaluation of Rock Fracture Toughness in the Presence of Pressurized Water at Elevated Temperature by Means of AE Technique", *Proceedings of the 6th Japan Symposium on Rock Mechanics*, pp. 391–396, Dec. 1984, (corresponds to Progress in Acoustic Emission II), pp. 624–631, Oct. 1984.

Primary Examiner—Stephen J. Novosad
Assistant Examiner—Bruce M. Kisliuk
Attorney, Agent, or Firm—Parkhurst & Oliff

[57] ABSTRACT

A method of collecting geothermal steam using Acoustic Emission Microseismic Activity (AE/MA) measurement includes the steps of (a) surveying an AE wave emitted in subsurface cracks to obtain the size of a water permeable geothermal reservoir by analyzing the AE wave, (b) further surveying the AE wave emitted in and around the periphery of the geothermal reservoir, (c) operating the wellhead valve of the geothermal well connected with the geothermal reservoir, thereby extending or preventing the extension of the geothermal reservoir in accordance with the information obtained in step (a) and/or step (b), thereby stably obtaining a predetermined quantity of steam of high quality. Thus, the method can stably obtain geothermal steam of high quality by accurately surveying or monitoring subsurface cracks by an AE measurement technique and propagating the subsurface cracks or suppressing the propagation of the cracks.

10 Claims, 5 Drawing Sheets

Accumulate flow rate value (t/hour)

METHOD OF COLLECTING GEOTHERMAL STEAM USING AE/MA MEASUREMENT

BACKGROUND OF THE INVENTION

The present invention relates to a method of collecting geothermal steam using AE/MA (Acoustic Emission/Microseismic Activity) measurement and, more particularly, to a method of always obtaining stable geothermal steam quantity by controlling cracks communicating with a subsurface geothermal reservoir to stabilize the geothermal reservoir.

Geothermal steam is geothermal fluid heated by the heat of a magma reservoir, which fluid is stored in an entirely water permeable crack (generally referred to as "a geothermal reservoir") which has been propagated from subsurface cracks. In other words, a geothermal reservoir is regarded as a subsurface boiler, and it has been known per se to utilize the steam of the geothermal reservoir for a geothermal power plant by collecting the steam of the reservoir.

The geothermal power plant must be supplied with the steam stably for a long period of time, but the steam quantity is gradually reduced according to the state of the subsurface geothermal reservoir, and it may happen that a predetermined amount of steam cannot be stably produced.

In such a case, a method of obtaining a predetermined quantity of steam by excavating a new geothermal well has been heretofore employed.

The geothermal reservoir can be generally categorized as one of three types, a steam dominant type, a steam-hot water type or a hot water dominant type, in accordance with the ratio of steam phase to liquid phase in subsurface cracks. Most geothermal reservoirs are of the steam-hot water type or the hot water dominant type.

The geothermal reservoir of the steam-hot water type or the hot water dominant type injects a large quantity of hot water together with steam. A geothermal power plant separates the steam from the hot water and supplies the steam to a turbine, or partly flushes the hot water and supplies it as low pressure steam to the turbine, but most of the hot water cannot be utilized and must be disposed of.

However, the hot water injected from the subsurface frequently contains arsenic or other detrimental components, and it is difficult to exhaust the hot water to rivers from the view of environmental sanitation. Thus, the hot water produced together with the steam is presently returned through a reduced well to the subsurface by excavating the reduced well separate from the geothermal well in the geothermal power plant.

If the geothermal well heretofore excavated as described above cannot collect a predetermined quantity of steam, or if the steam quantity has gradually decreased to the point where a predetermined quantity of steam cannot be obtained, it not only costs a lot to excavate a new geothermal well, but it might be difficult to excavate a new geothermal well depending upon the district.

The following problems are pointed out in the geothermal well of steam-hot water type or hot water dominant type as described above.

The reduced well of steam-hot water type or hot water dominant type is disposed relatively near to the geothermal well due to its layout. It is not problemmatical if a production zone for collecting steam through the geothermal well from the geothermal reservoir and a reinjection zone for reinjecting the hot water to the ground through the reinjection well are independent from one another to prevent interference therebetween. However, if the production zone and the reinjection zone communicate with one another, reinjected hot water of low temperature (100°-160° C.) flows into the geothermal reservoir of high temperature (200° C. or higher) to cool the steam, with the result that the steam production quantity is remarkably reduced and steam of high quality cannot be stably produced.

The abovementioned geothermal reservoir is of one type of preferable water permeable subsurface cracks, which contains a number of preceding cracks, and it is recognized that a plurality of geothermal reservoirs described above are disposed in the geothermal field. However, it is not always sufficient to analyze the accurate size of the geothermal reservoir and the state of the subsurface cracks included in the geothermal reservoir, which are disadvantages of geothermal steam production.

SUMMARY OF THE INVENTION

Accordingly, an object of the present invention is to provide a method of collecting geothermal steam using AE/MA measurement which can eliminate the abovementioned problems, drawbacks and disadvantages and stably obtain geothermal steam of high quality by accurately surveying or monitoring subsurface cracks by an AE measurement technique and propagating the subsurface cracks or suppressing the propagation of the cracks.

According to the present invention, there is provided a method of collecting geothermal steam using AE/MA measurement which comprises the steps of (a) surveying an AE wave emitted in subsurface cracks to obtain the size of a water permeable geothermal reservoir by analyzing the AE wave, (b) further surveying the AE wave emitted in and around the periphery of the geothermal reservoir, (c) operating the wellhead valve of the geothermal well connected with the geothermal reservoir, thereby extending or preventing the extension of the geothermal reservoir in accordance with the information obtained in step (a) and/or step (b), thereby stably obtaining a predetermined quantity of steam of high quality.

The AE measurement technique further described in the specification detects an acoustic emission (AE) wave constituted of the frequencies of voice band emitted immediately before a substance is deformed or fractured.

The AE measurement technique has been used for nondestructive tests in the field of metallic material, a plant structure or a pressure vessel, and the AE waves are recently measured upon fracture of rocks, and there is proposed a method of presuming a macrocrack occurrence starting point from the abruptly increasing point of the AE energy in laboratory experiment (Disclosed in Journal of Mining and Metalluragical Institute of Japan, Vol. 100, No. 1151 Issued in January, 1984).

As an example of AE measurement in the field, there was a report of the relationship between the rise of pressure in hydraulic fracturing of geothermal wells and the emission of AE utilized for geothermal power plants (disclosed in Journal of Mining and Metalluragical Institute of Japan, Vol. 98, No. 1129 issued in March, 1982).

Various reports have been issued in addition to the abovementioned reports as to the detection of the AE in the subsurface. In summary, detection is achieved by burying an AE sonde in the subsurface, amplifying the AE detected by the AE sonde by a main amplifier, recording the waveform of the AE in a data recorder, further A/D-converting the waveform to input it into a computer, and deciding a distance from the AE sonde and an AE emission source by a time difference between P-wave and S-wave in the computer. The AE sonde includes a tri-axial AE sonde and a mono-axial AE sonde, and the tri-axial AE sonde is preferable from a view of detecting with a single observation well.

The AE energy can be calculated from the amplitude of the detected AE waveform or a ringdown count.

In the abovementioned reports, and particularly in the former, the fracture toughness value is defined by the AE energy abruptly increasing in the case where a crack propagates and a stress intensity factor at the AE abruptly increasing point.

On the other hand, according to "Proceedings of the 6th Japan Symposium on Rock Mechanics" (issued in December, 1984), the conditions that a crack is propagated in accordance with fracture mechanics is given by the following equation (1) when the crack is regarded as a penny shape having a radius R.

$$KisF = 2(P - S)\sqrt{R/\pi} \quad (MPa \cdot \sqrt{m}) \quad (1)$$

wherein KisF represents the fracture toughness value of rocks, P represents downhole hydraulic pressure (MPa) when the crack is propagated, and S represents in situ crustal stress (MPa), and R represents a radius (m) of a subsurface crack having a penny-shape.

The above equation exhibits the propagation of the crack when the stress intensity factor of the edge of the crack is equal to or larger than the fracture toughness value of the rocks. The crustal stress S can be obtained from the hydraulic fracturing and the hydraulic pressure P when the crack is propogated can be obtained from the internal pressure of the geothermal reservoir to be measured.

Therefore, in order to propagate the crack (to extend the geothermal reservoir), the hydraulic pressure P may be increased by closing a wellhead valve provided in a geothermal well so that the stress intensity factor of the edge of the crack may exceed the fracture toughness value (KisF) of the rocks.

On the other hand, it is necessary to seal the geothermal well so as to inspect and repair the well. However, if the geothermal well is completely sealed, the crack might be propagated as described above. In order to prevent the crack from propagating (the geothermal reservoir from extending), the wellhead valve provided in the geothermal well may be closed so that the stress intensity factor of the edge of the cracks does not exceed the fracture toughness value of the rocks.

The stess intensity factor of the edge of the crack can be obtained by directly measuring hydraulic pressure. To this edge, an observation well connected directly with the geothermal reservoir should be separately excavated, and a pressure measuring unit must be installed in the bottom of the borehole of the observation well, resulting in considerable facility and expense. In addition, there is a problem in the periodic maintenance and supervision of the pressure measuring unit.

In order to solve the abovementioned problems, the inventors of the present invention have studied and consequently discovered the novel facts that the flow-rate of the geothermal fluid in the geothermal reservoir is obtained and can be used as a substituted value of the stress intensity factor of the edge of the crack in the geothermal reservoir, and that the flow-rate of the fluid when the AE is abruptly increased (determined by measuring the AE) is used as the limit value that the crack is propagated (i.e., as the threshold value of the propagation of the subsurface cracks).

DESCRIPTION OF THE PREFERRED EMBODIMENTS

The present invention will be described in more detail with reference to the accompanying drawings by way of preferred embodiments.

Figure 1:
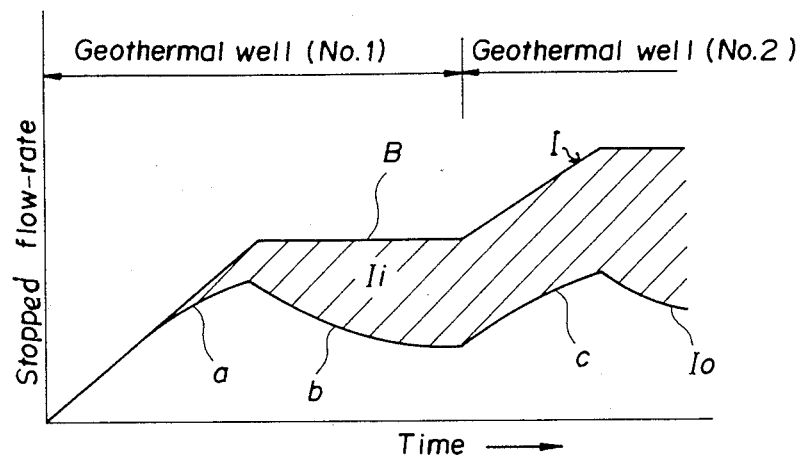
FIG. 1 is a graph showing the relationship between the stopped flow-rate and the sealing time.

FIG. 1 shows the relationship between the total flow-rate and the time in the case where the wellhead valve of a geothermal well is gradually throttled. In FIG. 1, geothermal wells No. 1 and 2 are connected with a geothermal reservoir, and the total quantity (I) of the flow-rate produced from the geothermal well No. 1 and the flow-rate produced from the geothermal well No. 2 is produced. Assume that the geothermal reservoir has a predetermined volume and geothermal fluid $I_O = I_i$ always flows to the geothermal reservoir.

When the wellhead valve of the geothermal well No. 1 is now gradually throttled, the internal pressure in the geothermal reservoir increases by geothermal fluid always flowing into the reservoir, and the total flow-rate of the fluid (hereinafter referred to as "stopped flow-rate") stored in the geothermal reservoir increases as time is elapsed, as shown by a solid line B in FIG. 1. When the valve is completely closed, it is considered that the stopped flow-rate does not vary but remains constant as the time is elapsed. When the wellhead valve of the geothermal well No. 2 is then gradually throttled, it is considered that the stopped flow-rate again increases as the time is elapsed.

However, when the wellhead valve of the geothermal well No. 1 is gradually throttled, the stopped flow-rate in fact varies as shown by a solid line a in FIG. 1. When the valve is completely closed, the flow-rate gradually decreases from the solid line a to vary as shown by a solid line b in FIG. 1. When the wellhead valve of the geothermal well No. 2 is further gradually throttled, it is recognized that the flow-rate varies in accordance with a solid line c in FIG. 1 similar to the solid line a in FIG. 1.

It is judged that there is a leakage of the flow-rate corresponding to a shaded portion (Ii) between the solid lines a-b-c and the solid line B in FIG. 1 from the geothermal reservoir due to the increase in the internal pressure by the closure of the valve.

According to studies by the inventors of the present invention, the solid lines a and b in FIG. 1 increase and decrease in an exponential function manner, and the flow-rate ($I_O$) in the geothermal reservoir subtracted by the leakage can be obtained by knowing the stopped flow-rate and the time constant.

Then, when the flow-rate ($I_O$) at the abruptly increasing point of the AE energy is obtained, the flow-rate can be determined as the threshold value of the propagation of the cracks.

Figure 2:
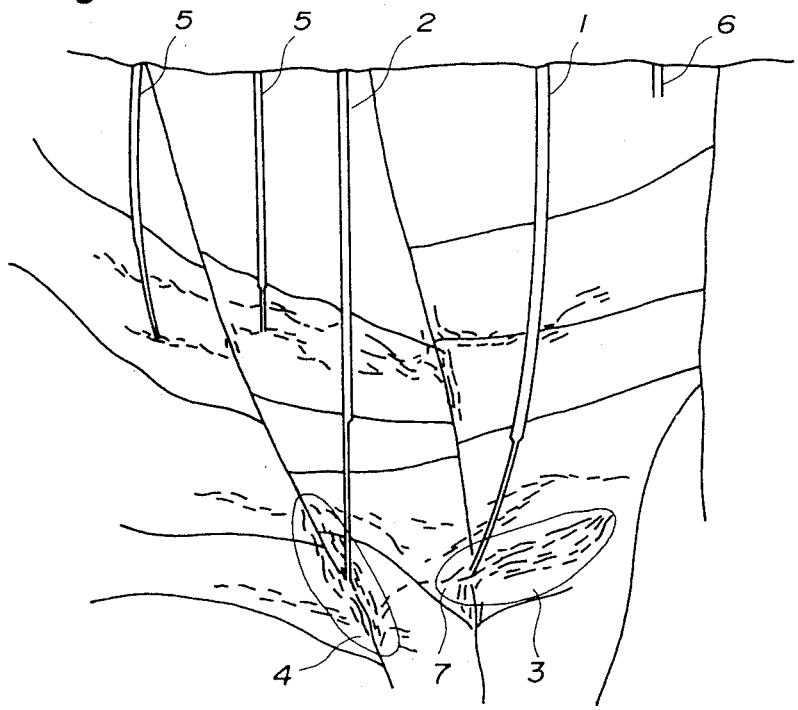
FIG. 2 is a schematic view showing a model of one example of a geothermal field.

FIG. 2 shows a model of an example of a geothermal steam production field. Geothermal wells 1 and 2 are respectively connected with geothermal reservoirs 3 and 4, and injection wells 5 and 5 are provided. In FIG. 2, the geothermal reservoirs 3 and 4 are designated in an enlarged size for the convenience of the description. The reservoirs 3 and 4 are independent from one another so as not to interfere with one another. An observation well 6 (having a depth of approx. 30 to 30 m) is excavated in the field, and an atri-axial AE sonde is installed in the well 6.

Assume now that the collected steam quantity of the geothermal well 1 decreases. In this case, if the flow-rate of the geothermal reservoir 3 is small and the flow-rate of the geothermal reservoir 4 is large, a geothermal well is heretofore newly excavated to the geothermal reservoir 4 connected with the geothermal well 2, or the geothermal well 1 is excavated by a multileg type to the geothermal reservoir 4.

However, according to the present invention, the preceding crack 7 of the geothermal reservoir 3 is surveyed by an AE measurement technique, and the wellhead valve of the geothermal well 1 is throttled to propagate the crack 7, thereby connecting with the geothermal reservoir 4.

In this case, the position and the size of the crack 7 can be surveyed by an AE sonde in the observation well 6, and the throttling degree of the wellhead valve of the geothermal well 1 can be determined from the threshold value of the total flow-rate of the geothermal reservoir 3. Further, the propagating direction of the edge of the crack 7 and the intensity of the AE energy of this case can be simultaneously measured by the AE sonde.

Therefore, when it is confirmed that the edge of the crack 7 is propagated to connect with the geothermal reservoir 4, the wellhead valve of the geothermal well 1 is closed to propagate the crack 7, thereby connecting with the geothermal reservoir 4. Thus, the geothermal well 1 can collect the steam of the geothermal reservoir 4 through the geothermal reservoir 3.

More particularly, the present invention can obtain a predetermined quantity of steam by slightly regulating the pressure by the wellhead valve to largely reduce the cost without excavating a new geothermal well or excavating the geothermal well 1 by a multileg type when the geothermal well 1 is so attenuated as to be unable to obtain a predetermined quantity of steam.

If the injection well cannot reinject a predetermined quantity of hot water, the predetermined quantity of reinjected hot water can be reinjected similarly by grasping the state of the crack in the vicinity of the bottom of the borehole of the reinjection well by the AE measurement technique, surveying the direction in which the reinjection zone does not interfere with the production zone, and excavating the reinjected well.

A method of propagating a crack will be described in more detai. The propagation of the crack can be suppressed by the following method even when there is a possibility that the production zone is connected with the reinjected zone.

The AE emitted from the geothermal well 1 or 2 and the reinjected well 5 is measured, and analyzed to survey the size of the geothermal reservoirs 3 and 4. The AE emitted in the geothermal reservoir and around the periphery of the geothermal reservoir are surveyed while closing the wellhead valve of the geothermal well 1 or 2 to obtain a time constant from a valve closing pressure attenuation curve when the wellhead valve of the geothermal well 1 or 2 is closed, and to obtain a curve of the relationship between the total flow-rate in the reservoir subtracted by the leakage when the wellhead valve is closed and the time.

Then, the threshold value of the total flow-rate of the case where the crack is propogated is determined from the relationship between the total flow-rate of geothermal reservoir 3 or 4 and the AE energy. In this case, the possibility of the crack propagating can be substantially specified from the size of the AE emission source and the AE energy.

After the threshold value of the total flow-rate is determined as described above, when the wellhead valve is regulated by determining the time and/or the sequence of closing valves so that the total flow-rate of the geothermal reservoir 3 or 4 exceeds the threshold value, the geothermal reservoir 3 or 4 and the preceding crack connected with the reservoir can be propagated, and when the wellhead valve is regulated by determining the closing time of the valve so that the total flow-rate of the geothermal reservoir 3 or 4 does not exceed the threshold value, the propagation of the geothermal reservoir 3 or 4 and the preceding crack connected with the reservoir can be suppressed.

Therefore, if there is a possibility that the production zone may interfere with the reinjection zone, no countermeasure can be heretofore connected to the interference. However, the present invention can prevent in advance such an interference between the production zone and the reinjection zone. Consequently, cooling of the geothermal reservoir by the reinjected hot water of low temperature can be avoided to stably obtain geothermal steam of high quality in a predetermined quantity.

Several geothermal wells and reinjected wells are excavated at the place where a large quantity of geothermal steam is required as for a geothermal power plant, and a plurality of geothermal wells are connected with one geothermal reservoir of large size.

Accordingly, when a plurality of geothermal wells are installed, the position, the size and the propagating direction of the crack to be measured are surveyed by the AE measurement technique, and the object of the present invention can be performed by suitably selecting the geothermal well or wells in response to the object of propagating the crack to be used or suppressing the propagation of the crack, regulating the wellhead pressure or suitably selecting the sequence of regulating the wellhead pressure of the geothermal wells and the time until the wellhead valve is closed.

The following is further explanation as to how to suppress the extension of one geothermal reservoir connected with a plurality of geothermal wells.

Simultaneous or continuous closure of the wellhead valves of geothermal wells connected with one reservoir should be avoided. In other words, when it is necessary to close the valves continuously, it is necessary to obtain sufficient time from the stop of one well to the subsequent stop of another well. Also, when the AE activation is observed, it is preferable to open the wellhead valves. The extension of the geothermal reservoir can also be suppressed by the operation in which the valve of the geothermal well having a large stopped flow-rate is first closed, and then the valve of the geothermal well having small stopped flow-rate is closed. Since the cracks extend upwardly when a particular valve preferably is closed, the particular valve should not be closed. If it is necessary to close such valve, it is necessary to close the valve slowly.

In addition, the AE measurement technique can accurately determine the geometrical configuration of the crack from the horizontal and vertical distribution of the AE emission source, presume the distance between the crack (geothermal reservoir) and the geothermal well, detect the activity of the AE energy at every geothermal well if a plurality of geothermal wells are present, identify which of the geothermal wells is connected with the geothermal reservoir, accordingly divide the geothermal wells into groups at every subsurface geothermal reservoir, determine the rank of the wells, and clearly grasp the circumstances of the subsurface geothermal field.

According to the present invention as described above, the AE measurement technique can survey the geothermal reservoir and the preceding crack continued to the reservoir, precisely identify the cause of the geothermal well being attenuated, operate the wellhead valve of the geothermal well in response to the state of the geothermal reservoir, and regulate the internal pressure and the flow-rate of the geothermal reservoir to stably obtain geothermal steam of high quality by propagating the subsurface crack or preventing the propagation of the crack.

Hereinafter, examples of the present invention will be described in detail.

EXAMPLE 1

The wellhead valve of a geothermal well for producing 382 t/hour of flow-rate was gradually throttled with stopped flow-rate of one minute at 2.4 t/hour, and closed in approx. 150 min.

Figure 3:
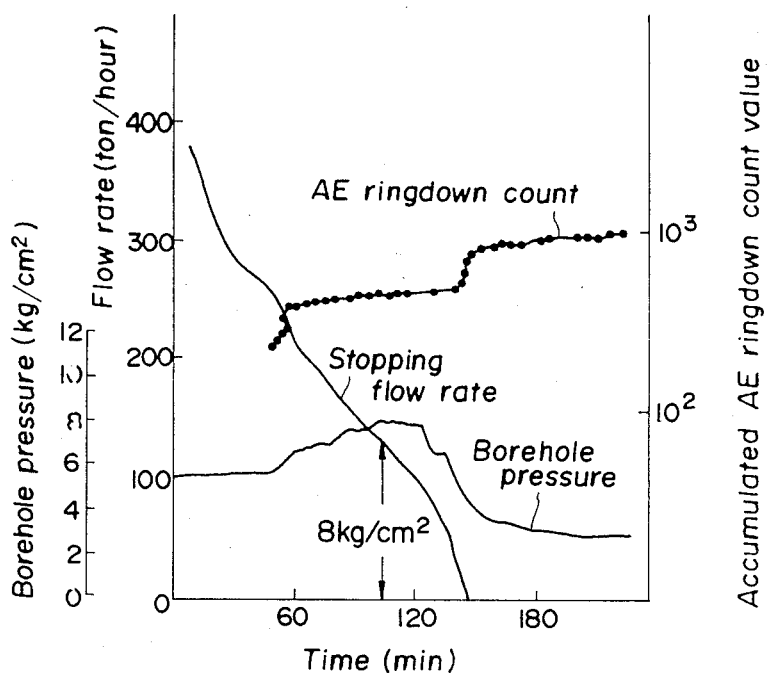
FIGS. 3 and 4 are graphs showing the relationships between the flow-rate, the wellhead pressure and the time until production wells are sealed.

In FIG. 3, the flow-rate, the wellhead pressure and the AE ringdown count of the time until the wellhead valve of the geothermal well was closed are shown.

In FIG. 3, even if the wellhead pressure became maximum (8 kg/cm$^2$), the abrupt increase in the AE ringdown count was recognized. In this case, even if the wellhead valve was completely closed, the abrupt increase in the AE ringdown count was not recognized.

More particularly, when the wellhead valve of the geothermal well was gradually throttled across a long period of time, the abrupt increase in the AE ringdown count was not recognized. This exhibits that the abrupt closing pressure in the case where the geothermal well was closed was irrespective of the geothermal reservoir, and hence the AE corresponding to the propagation of the macrocrack was not emitted. In other words, the fact that the propagation of the crack of the geothermal reservoir can be suppressed is exhibited.

EXAMPLE 2

Figure 4:
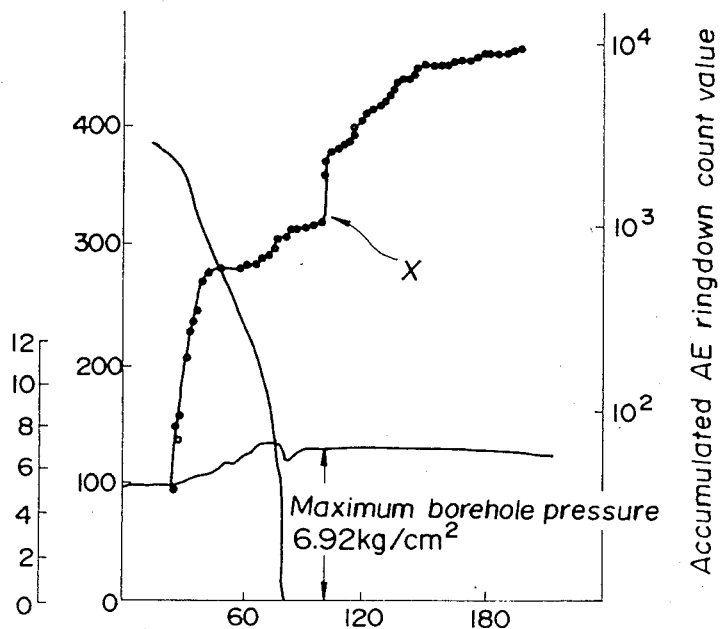

The wellhead valve of another geothermal well for producing the same flow-rate as that in Example 1 was completely closed in approx. 80 min. with the stopped flow-rate of one minute at 6.2 t/hour. As a result, as shown in FIG. 4, the AE started emitting after approx. 20 min. had elapsed from the start of closing the wellhead valve, the AE was activated after approx. 50 min., and the abruptly increasing point X of the AE ringdown count was presented at the maximum value of the wellhead pressure after closing.

Thus, when the wellhead valve of the geothermal well was closed in a short period of time, the activation of the AE and the abruptly increasing point of the AE were presented, and it was accordingly recognized that the crack was propagated.

EXAMPLE 3

The wellhead valves of the geothermal wells (No. 1 to No. 8) in the geothermal field K having eight geothermal wells were sequentially closed. The closing conditions and the stopped flow-rates of the geothermal wells at that time are as in Table 1.

TABLE 1

| Geothermal Well No. | 1 | 2 | 3 | 4 | 5 | 6 | 7 | 8 | |
|---|---|---|---|---|---|---|---|---|---|
| Stopped flow-rate (t/hr) Reduction up to closure of valve | 135 | 255 | 201 | 119 | 118 | 388 | 331 | 411 | A |
| Time up to closure (min) | 18 | 64 | 42 | 14 | 16 | 66 | 105 | 118 | B |
| Time interval to close next production well after closure (min) | | 15 | 27 | 30 | 7 | 13 | 120 | 32 | C |
| Time up to AE emission after closure (min) | 7 | 50 | 2 | 15 | 30 | 45 | 35 | 15 | D |
| Flow-rate *−1 in reservoir subtracted by leakage (t/hr) Reduction after closure | 127 | 206 | 175 | 114 | 112 | 311 | 233 | 277 | E |
| (Cn − Dn + Dn + 1) Attenuation time (min) | | 58 | — | 43 | 22 | 28 | 110 | 12 | F |
| Flow-rate *−2 in reservoir subtracted by leakage (t/hr) | | 105 | 311 | 421 | 495 | 522 | 598 | 798 | G |
| Flow-rate at closing | 127 | 311 | 486 | 535 | 607 | 863 | 831 | 1075 | H |

TABLE 1-continued

| Geothermal Well No. | 1 | 2 | 3 | 4 | 5 | 6 | 7 | 8 |
|---|---|---|---|---|---|---|---|---|
| time (En + 1 + G) (t/hr) | | | | | | | | |

Figure 5:
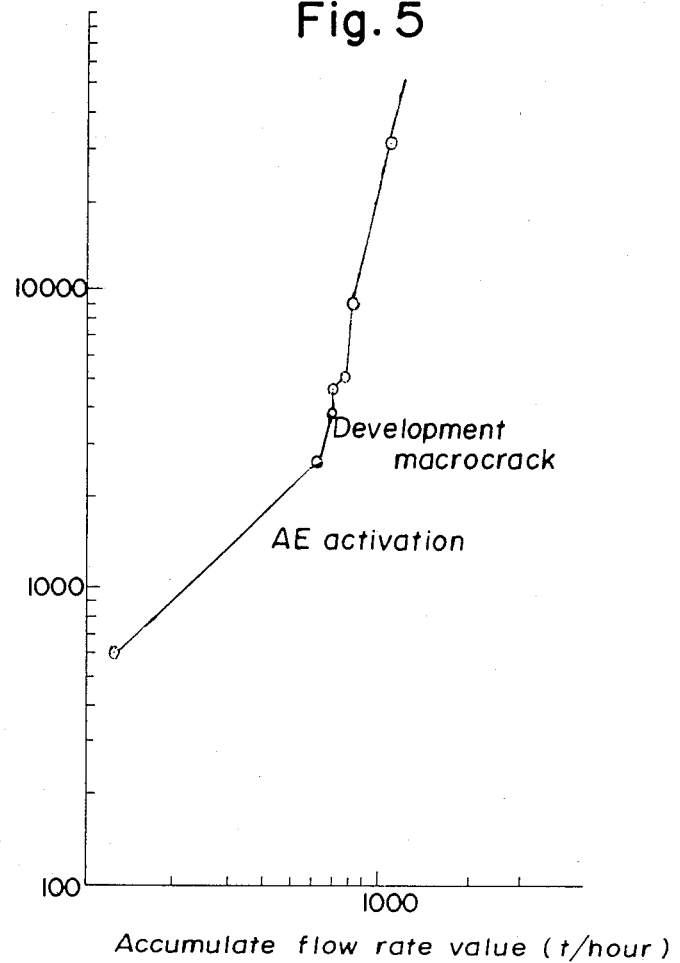
FIG. 5 is a graph showing the relationship between the accumulated AE ringdown count and the accumulated flow-rate value.

(Note)
1*—1 is obtained from $I_O = (1 - e^{-t/\tau}) \times A$, where $\tau = 300$ min.
2*—2 is obtained from $I_i = e^{-t/\tau} \times I_O$ FIG. 5 shows the relationship between the accumulated AE ringdown counts and the accumulated flow-rates after closure of the geothermal wells Nos. 1 to 8. In FIG. 5, the AE was activated when the geothermal well No. 5 was stopped, i.e., at 607 t/hour time, and it was also recognized that the AE abruptly increased when the flow-rate exceeded 800 t/hour. Therefore, in this geothermal reservoir, the subsurface crack could be propagated at the stage that the flow-rate exceeds the threshold value of 600 t/hour.

Figure 6:
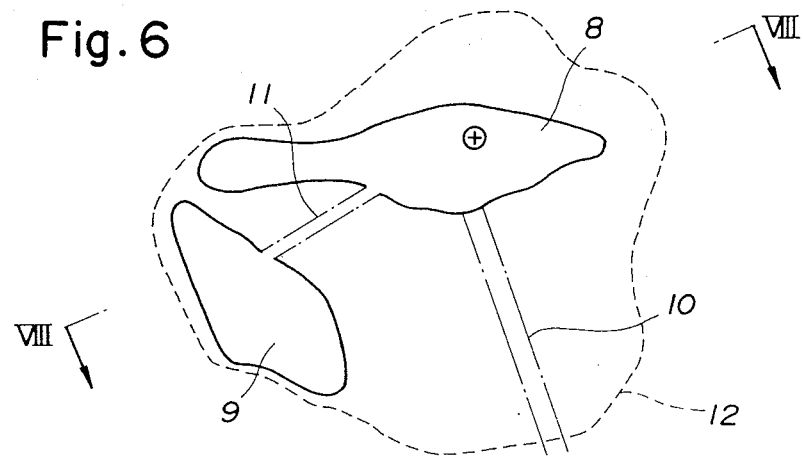
FIG. 6 is a plan view of a geothermal reservoir in an embodiment of the invention.

FIG. 6 shows the geothermal reservoir (designated by a solid line in FIG. 6) of the geothermal field K surveyed by the AE measurement technique. A geothermal reservoir 9 is disposed near the geothermal reservoir 8, an interrupted layer 10 is connected with the layer 8, and the layers 8 and 9 are slightly connected by an interrupted layer 11. The view of the model of the geothermal reservoir in FIG. 6 precisely coincides with the results of geological and physical surveys. In FIG. 6, (+) designates the installing position of the AE sonde.

Here, when the geothermal wells (Nos. 1 to 8) are all closed as in Table 1, the geothermal reservoirs 8 and 9 gradually extend by the propagation of the crack, and integrate as shown by a broken line in FIG. 6 to form a large geothermal reservoir 12.

Figure 7:
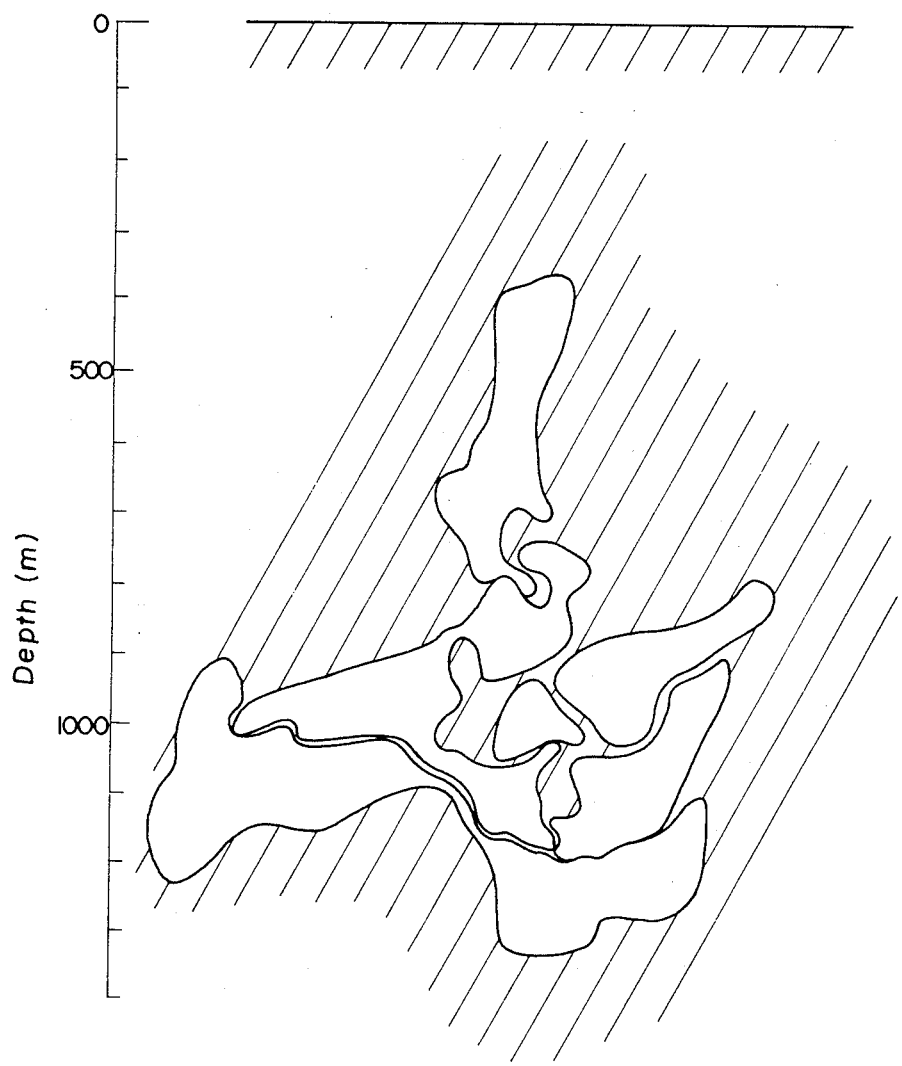
FIG. 7 is a sectional view taken along the line VIII—VIII in FIG. 6.

FIG. 7 shows a sectional view of the geothermal reservoir of FIG. 6 in a vertical direction. It is recognized that the subsurface crack is propagated also in the upward direction, and partly propagated upwardly approx. 600 m.

When the crack propagated upwardly is presented as described above, there is an undesirable possibility of connecting the geothermal reservoir with the reinjected zone.

It is necessary to close the geothermal well so as to inspect and repair the well. In this case, the propagation of the subsurface crack can be suppressed as in the following Example 4.

EXAMPLE 4

The geothermal well to be considered to affect the crack possibly upwardly propagated of the geothermal wells in the geothermal field K is selected and closed. The conditions and the stopped flow-rate at that time are as in Table 2.

TABLE 2

| Geothermal Well No. | 1 | 2 | 3 | 4 | 5 | |
|---|---|---|---|---|---|---|
| Stopped flow-rate (t/hr) Reduction up to closure of valve | 157 | 382 | 161 | 182 | 193 | A |
| Time up to closure (min.) | 41 | 120 | 12 | 25 | 36 | B |
| Time interval to close next poduction well after closure (min.) | | 54 | | 93 | 50 | C |
| Time up to AE emission after closure (min.) | 6 | 45 | 7 | 15 | 50 | D |
| Flow-rate *—1 in reservoir subtracted by leakage (t/hr) Reduction after closure | 137 | 256 | 155 | 167 | 171 | E |
| (Cn — Dn + Dn + 1) | | 93 | 142 | 101 | 85 | F |

TABLE 2-continued

| Geothermal Well No. | 1 | 2 | 3 | 4 | 5 | |
|---|---|---|---|---|---|---|
| Attenuation time (min.) Flow-rate *—2 in reservoir subtracted by leakage (t/hr) | 100 | 222 | 269 | 328 | | G |
| Flow-rate at closing time (En + 1 + G) (t/hr) | 154 | 356 | 377 | 436 | 499 | H |

Figure 8:
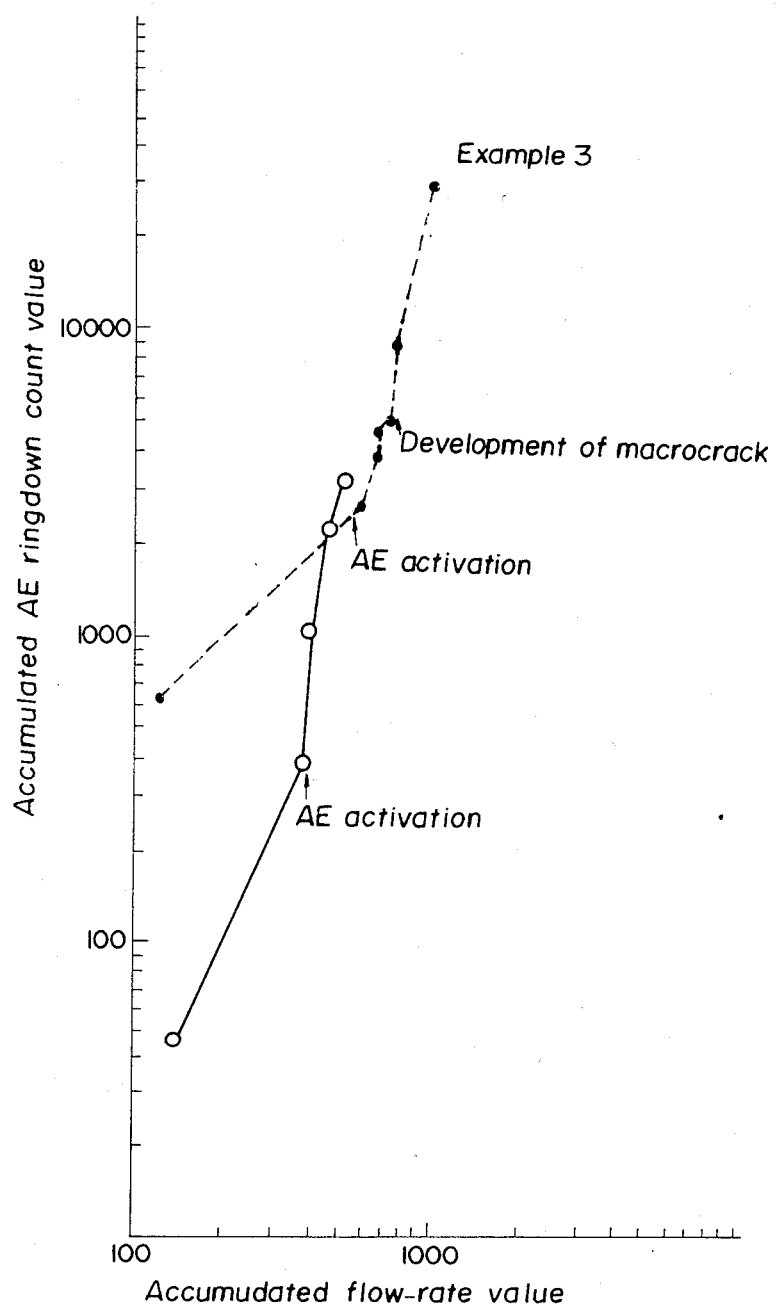
FIG. 8 is a graph showing the relationship between the accumulated AE ringdown count and the accumulated flow-rate value.

(Note)
1*—1 is obtained from $I_O = (1 - e^{-t/\tau}) \times A$, where $\tau = 300$ min.
2*—2 is obtained from $I_i = e^{-t/\tau} \times I_O$ FIG. 8 shows the relationship between the accumulated AE ringdown count and the accumulated stopped flow-rate after closure of the geothermal well in Table 2. When the time up to the closure of the geothermal well was lengthened and the wellhead valve was closed, the AE ringdown count was not yet activated even when the geothermal wells Nos. 1 to 5 were all closed.

More specifically, when the time up to the closure of the geothermal well is lengthened to gradually throttle the wellhead valve as described above, the flow-rate does not exceed 600 t/hour of the threshold value of the flow-rate of the geothermal reservoir, and the propagation of the subsurface crack can be reliably suppressed.

What is claimed is:

1. A method of collecting geothermal steam using Acoustic Emission/Microseismic Activity (AE/MA) measurement comprising the steps of:
    (a) surveying an AE wave emitted underground to obtain the size of a water permeable geothermal reservoir by analyzing the AE wave,
    (b) further surveying the AE wave emitted in and around the geothermal reservoir, and
    (c) closing wellhead valves of one or more geothermal wells connected with the geothermal reservoir to exceed a fracture toughness of rocks in and around the geothermal reservoir while selecting a sequence of closing the wellhead valves and/or a time until the wellhead valves are closed, thereby extending the geothermal reservoir in accordance with information obtained in step (a) and/or step (b), thereby stably obtaining a predetermined quantity of steam of high quality.

2. The method according to claim 1, wherein total flow-rate of geothermal fluid in said geothermal reservoir is used as a substituted value of the fracture toughness of rocks in and around said geothermal reservoir in the following equation for representing the condition of propagating a crack in accordance with fracture mechanics:

$$KisF = 2(P - S)\sqrt{R/\pi} \quad (MPa \cdot \sqrt{m})$$

wherein KisF represents the fracture toughness of rocks in and around the geothermal reservoir, P represents the downhole hydraulic pressure (MPa) when the crack is propagated, S represents in situ crustal stress (MPa), and R represents a radius (m) of a subsurface crack having a penny-shape.

3. The method according to claim 2, wherein total flow-rate ($I_O$) of geothermal fluid in said geothermal reservoir subtracted by a leakage until said wellhead valve is closed is obtained by the following equation:

$$I_O = (1 - e^{-t/\tau}) \times A$$

wherein t represents the time (min.) up to the closure of the wellhead valve, $\tau$ represents a time constant, and A represents a stopped flow-rate (t/hour), and total flow-rate ($I_i$) of geothermal fluid in said geothermal reservoir subtracted by a leakage after the wellhead valve is closed is obtained by the following equation:

$$I_i = e^{-t/\tau} \times I_O$$

wherein t represents the time (min.) after the closure of the wellhead valve, and $\tau$ represents a time constant.

4. A method of collecting geothermal steam using Acoustic Emission/Microseismic Activity (AE/MA) measurement comprising the steps of:
  (a) surveying an AE wave emitted underground to obtain the size of a water permeable geothermal reservoir by analyzing the AE wave,
  (b) further surveying the AE wave emitted in and around the geothermal reservoir, and
  (c) closing wellhead valves of one or more geothermal wells connected with the geothermal reservoir so as not to exceed a fracture toughness of rocks in and around the geothermal reservoir while selecting a sequence of closing the wellhead valves and/or a time until the wellhead valves are closed, thereby, in accordance with information obtained in step (a) and/or step (b), preventing an extension of the geothermal reservoir which would cause communication of a production zone and a reinjection zone to cool the geothermal reservoir, thereby stably obtaining a predetermined quantity of steam of high quality.

5. The method according to claim 4, wherein total flow-rate of geothermal fluid in said geothermal reservoir is used as a substituted value of the fracture toughness of rocks in and around said geothermal reservoir in the following equation for representing the condition of propagating a crack in accordance with fracture mechanics:

$$KisF = 2(P - S)\sqrt{R/\pi} \quad (MPa \cdot \sqrt{m})$$

wherein KisF represents the fracture toughness of rocks in and around the geothermal reservoir, P represents the downhole hydraulic pressure (MPa) when the crack is propagated, S represents in situ crustal stress (MPa), and R represents a radius (m) of a subsurface crack having a penny-shape.

6. The method according to claim 5, wherein total flow-rate ($I_O$) of geothermal fluid in said geothermal reservoir subtracted by a leakage until said wellhead valve is closed is obtained by the following equation:

$$I_O = (1 - e^{-t/\tau}) \times A$$

wherein t represents the time (min.) up to the closure of the wellhead valve, $\tau$ represents a time constant, and A represents a stopped flow-rate (t/hour), and total flow-rate ($I_i$) of geothermal fluid in said geothermal reservoir subtracted by a leakage after the wellhead valve is closed is obtained by the following equation:

$$I_i = e^{-t/\tau} \times I_O$$

wherein t represents the time (min.) after the closure of the wellhead valve, and $\tau$ represents a time constant.

7. A method of collecting geothermal steam using Acoustic Emission/Microseismic Activity (AE/MA) measurement comprising the steps of:
  (a) surveying an AE wave emitted in subsurface cracks to obtain the size of a water permeable geothermal reservoir by analyzing the AE wave,
  (b) further surveying the AE wave emitted in and around the geothermal reservoir while closing a wellhead valve of a geothermal well,
  (c) obtaining a total flow-rate of geothermal fluid in the geothermal reservoir when the wellhead valve is closed,
  (d) determining a threshold value of the total flow-rate of the geothermal fluid when the geothermal reservoir is extended from the relationship between the total flow-rate and AE energy, and
  (e) operating the wellhead valve of the geothermal well by determining time and/or sequence of closing the wellhead valve so that the total flow-rate of the geothermal fluid in the geothermal reservoir exceeds the threshold value to extend the geothermal reservoir.

8. The method according to claim 7, wherein the flow-rate of the geothermal fluid when the AE wave is abruptly increased is used as the threshold value of the total flow-rate in the geothermal reservoir when said geothermal reservoir is extended.

9. A method of collecting geothermal steam using Acoustic Emission/Microseismic Activity (AE/MA) measurement comprising the steps of:
  (a) surveying an AE wave emitted in subsurface cracks to obtain the size of a water permeable geothermal reservoir by analyzing the AE wave,
  (b) further surveying the AE wave emitted in and around the geothermal reservoir while closing a wellhead valve of a geothermal wall,
  (c) obtaining a total flow-rate of geothermal fluid in the geothermal reservoir when the wellhead valve is closed,
  (d) determining a threshold value of the total flow-rate of the geothermal fluid when the geothermal reservoir is extended from the relationship between the total flowrate and AE energy, and
  (e) operating the wellhead valve of the geothermal well by determining time and/or sequence of closing the wellhead valve so that the total flow-rate of the geothermal fluid in the geothermal reservoir does not exceed the threshold value to suppress extension of the geothermal reservoir to a low temperature zone.

10. The method according to claim 9, wherein the flow-rate of the geothermal fluid when the AE wave is abruptly increased is used as the threshold value of the total flow-rate in the geothermal reservoir when said geothermal reservoir is extended.

* * * * *